(12) United States Patent
Lee

(10) Patent No.: US 10,846,569 B2
(45) Date of Patent: Nov. 24, 2020

(54) METHOD AND SYSTEMS FOR SCAN CONVERSION WITH HIGHER RESOLUTION

(71) Applicant: General Electric Company, Schenectady, NY (US)

(72) Inventor: Ho Lee, Seongnam (KR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 120 days.

(21) Appl. No.: 16/186,239

(22) Filed: Nov. 9, 2018

(65) Prior Publication Data
US 2020/0151513 A1     May 14, 2020

(51) Int. Cl.
| | |
|---|---|
| G06F 9/00 | (2006.01) |
| G06K 9/62 | (2006.01) |
| G06K 9/20 | (2006.01) |
| G06N 3/08 | (2006.01) |

(52) U.S. Cl.
CPC ........... *G06K 9/6262* (2013.01); *G06K 9/209* (2013.01); *G06N 3/08* (2013.01)

(58) Field of Classification Search
CPC ........ G06T 7/0012; G06T 5/40; G06T 5/001; G06T 2207/10116; G06T 2207/30004; A61G 8/5207; A61G 8/488; A61G 8/465; A61G 8/461; A61G 8/469; A61G 8/4427; G06K 9/6262; G06K 9/209
See application file for complete search history.

(56) References Cited

U.S. PATENT DOCUMENTS

| | | | |
|---|---|---|---|
| 5,904,652 A | 5/1999 | Gilbert et al. | |
| 6,083,168 A | 7/2000 | Hossack et al. | |
| 6,159,153 A * | 12/2000 | Dubberstein | A61B 8/06 128/916 |
| 6,685,644 B2 * | 2/2004 | Seo | A61B 8/0833 128/916 |
| 6,903,749 B2 | 6/2005 | Soo et al. | |
| 7,474,778 B2 * | 1/2009 | Shinomura | A61B 8/13 128/922 |
| 8,282,552 B2 * | 10/2012 | Lee | G01S 7/52026 382/132 |
| 9,194,941 B2 | 11/2015 | Hiriyannaiah | |
| 9,547,888 B2 | 1/2017 | Uno | |
| 9,649,090 B2 * | 5/2017 | Taniguchi | A61B 8/14 |
| 10,265,050 B2 * | 4/2019 | Richard | A61B 8/4483 |
| 10,635,943 B1 * | 4/2020 | Lebel | G06N 3/08 |
| 2016/0262720 A1 | 9/2016 | Henderson et al. | |
| 2018/0028153 A1 * | 2/2018 | Kuroiwa | A61B 8/488 |

* cited by examiner

*Primary Examiner* — Amir Alavi
(74) *Attorney, Agent, or Firm* — McCoy Russell LLP

(57) ABSTRACT

Various methods and systems are provided for ultrasound imaging. In one embodiment, a method comprises acquiring a first ultrasound dataset, generating a second ultrasound dataset from the first ultrasound dataset with a neural network, the second ultrasound dataset larger than the first ultrasound dataset, and scan converting the second ultrasound dataset to generate an image. In this way, higher resolution ultrasound images can be produced without increasing scan time or power.

20 Claims, 5 Drawing Sheets

METHOD AND SYSTEMS FOR SCAN CONVERSION WITH HIGHER RESOLUTION

FIELD

Embodiments of the subject matter disclosed herein relate to ultrasound imaging.

BACKGROUND

Ultrasound, for medical or industrial applications, is an imaging modality that employs ultrasound waves to probe the acoustic properties of a target object (e.g., the body of a patient) and produce a corresponding image. Generation of sound wave pulses and detection of returning echoes is typically accomplished by an ultrasound probe having an array of transducers. Such transducers typically include electromechanical elements capable of converting electrical energy into mechanical energy for transmission of ultrasonic waves into the target object (e.g., patient tissue) and mechanical energy back into electrical energy when the reflected ultrasonic waves reach the transducers.

BRIEF DESCRIPTION

In one embodiment, a method comprises acquiring a first ultrasound dataset, generating a second ultrasound dataset from the first ultrasound dataset with a neural network, the second ultrasound dataset larger than the first ultrasound dataset, and scan converting the second ultrasound dataset to generate an image. In this way, higher resolution ultrasound images can be produced without increasing scan time or power.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 6:
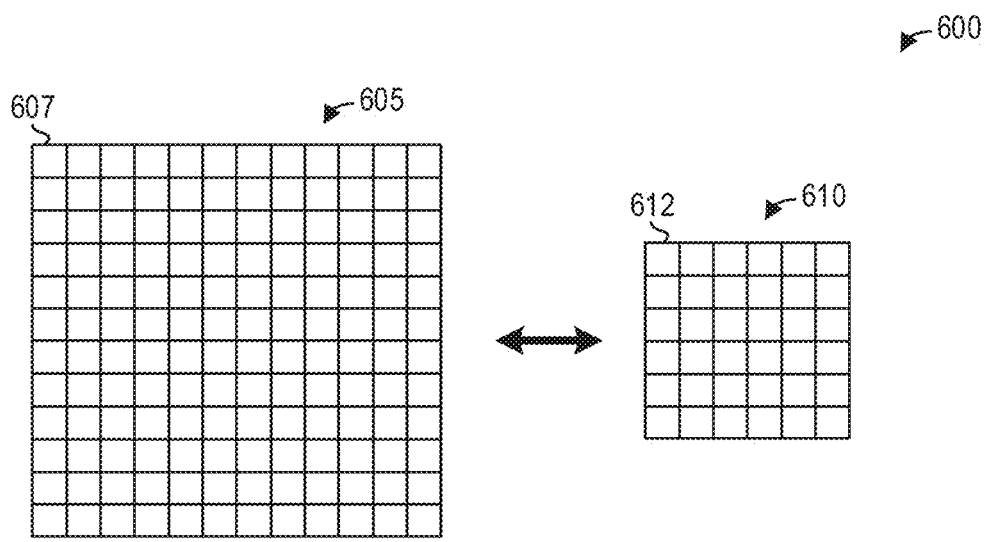
FIG. 6 shows pictorial examples of ultrasound datasets of different sizes for two-dimensional imaging.
Figure 7:
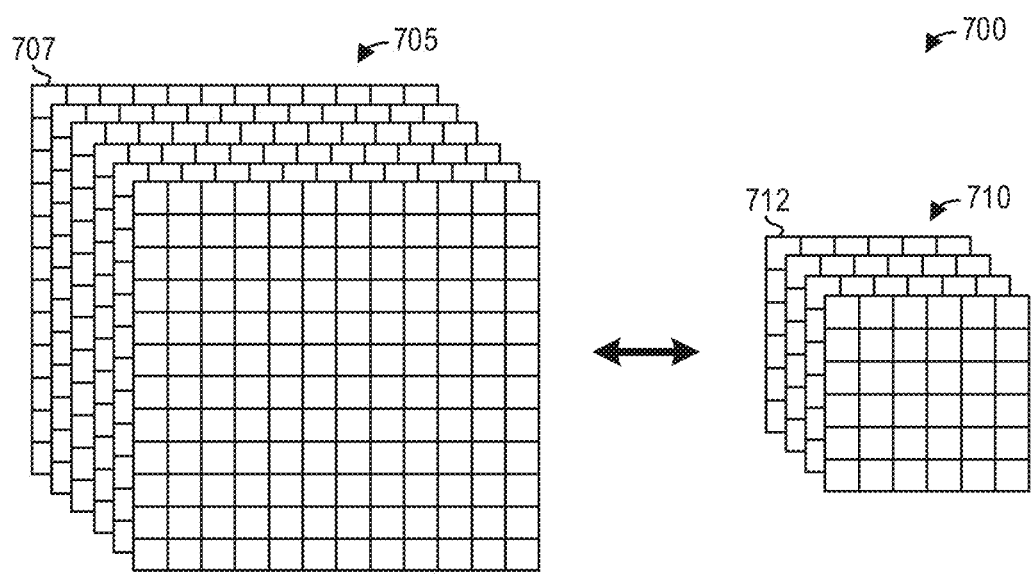
FIG. 7 shows pictorial examples of ultrasound datasets of different sizes for three- or four-dimensional imaging.

The following description relates to various embodiments of ultrasound imaging. Ultrasound transducers are included in an ultrasound imaging system, such as the ultrasound imaging system shown in FIG. 1. Ultrasound data acquired via the ultrasound transducers undergoes scan conversion, as depicted in FIG. 2, such that the ultrasound data is viewable on a display device. During scan conversion, an interpolation technique is applied to fill missing holes or pixels in an image. Consequently, if a block of data or an ultrasound dataset is small relative to the desired size of the image, the image will have areas of poor image resolution, especially for deeper regions. A method for increasing the image resolution, such as the method depicted in FIG. 3, includes augmenting an acquired ultrasound dataset with a neural network. A neural network for augmenting an ultrasound dataset, such as the neural network shown in FIG. 4, may receive an ultrasound dataset as input and output an augmented ultrasound dataset. In order to train the neural network so that the augmented ultrasound dataset yields a higher-resolution image, larger ultrasound datasets may be systematically reduced in size and input to the neural network, and images generated from augmented ultrasound datasets output by the neural network are compared to images generated from the larger ultrasound datasets. The techniques described herein may be applied to two-dimensional ultrasound datasets, as depicted in FIG. 6, as well as three- and four-dimensional ultrasound datasets, as depicted in FIG. 7.

Figure 1:
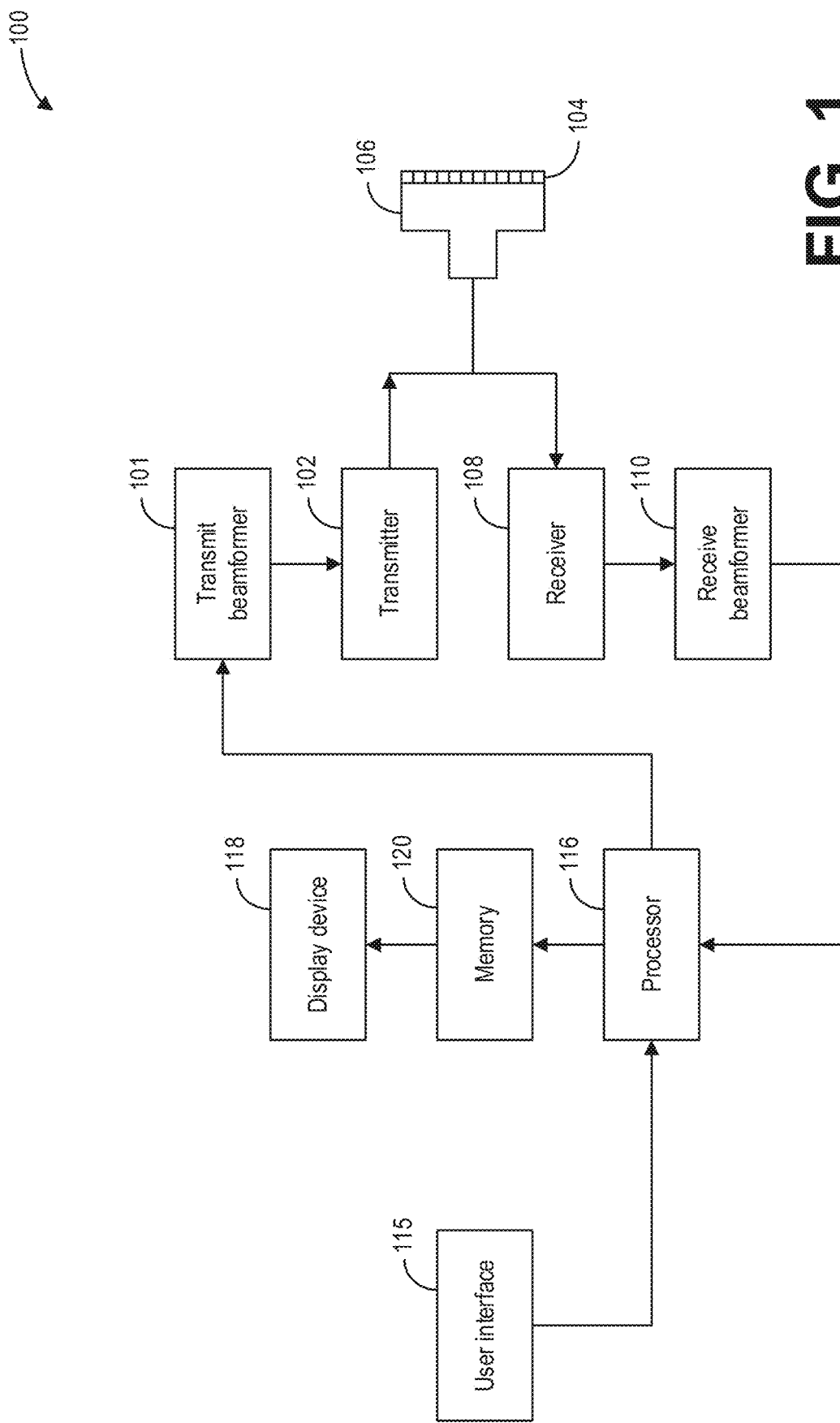
FIG. 1 shows an example ultrasound imaging system according to an embodiment of the invention.
Figure 2:
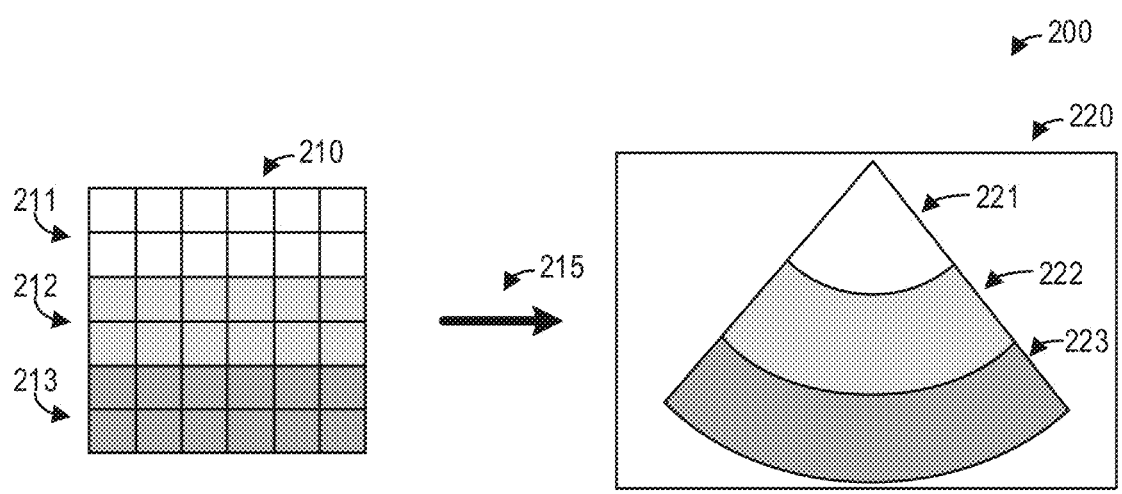
FIG. 2 shows a diagram illustrating scan conversion of ultrasound data to an ultrasound image.

Turning now to FIG. 1, a schematic diagram of an ultrasound imaging system 100 in accordance with an embodiment of the invention is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). According to an embodiment, the probe 106 may be a one-dimensional transducer array probe. However, in some embodiments, the probe 106 may be a two-dimensional matrix transducer array probe. As explained further below, the transducer elements 104 may be comprised of a piezoelectric material. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. Additionally, transducer element 104 may produce one or more ultrasonic pulses to form one or more transmit beams in accordance with the received echoes.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. A user interface 115 may be used to control operation of the ultrasound imaging system 100, including to control the input of patient data (e.g., patient medical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and a graphical user interface displayed on a display device 118.

The ultrasound imaging system 100 also includes a processor 116 to control the transmit beamformer 101, the transmitter 102, the receiver 108, and the receive beamformer 110. The processer 116 is in electronic communication (e.g., communicatively connected) with the probe 106. For purposes of this disclosure, the term "electronic communication" may be defined to include both wired and wireless communications. The processor 116 may control the probe 106 to acquire data according to instructions stored on a memory of the processor, and/or memory 120. The processor 116 controls which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment, the demodulation can be carried out earlier in the processing chain. The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time rate of 7-20 frames/sec. The ultrasound imaging system 100 may acquire 2D data of one or more planes at a significantly faster rate. However, it should be understood that the real-time frame-rate may be dependent on the length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec. The data may be stored temporarily in a buffer (not shown) during a scanning session and processed in less than real-time in a live or off-line operation. Some embodiments of the invention may include multiple processors (not shown) to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. It should be appreciated that other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds worth of frames of ultrasound data. The frames of data are stored in a manner to facilitate retrieval thereof according to its order or time of acquisition. The memory 120 may comprise any known data storage medium.

In various embodiments of the present invention, data may be processed in different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present invention, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (i.e., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

As an illustrative example, FIG. 2 shows a diagram illustrating an example method 200 for scan conversion of ultrasound data to an ultrasound image. The raw ultrasound dataset 210 is scan converted 215 into the ultrasound image 220. During the scan conversion 215, the polar coordinate data of the ultrasound dataset 210 is transformed into standard Cartesian coordinates for accurately displaying the ultrasound data on a two-dimensional display device.

Several regions corresponding to different depths of the scanned subject are depicted in various shades in both the ultrasound dataset 210 and the ultrasound image 220. In particular, the first region 211 of the ultrasound dataset 210 corresponds to the first region 221 of the ultrasound image, the second region 212 of the ultrasound dataset 210 corresponds to the second region 222 of the ultrasound image 220, and the third region 213 of the ultrasound dataset 210 corresponds to the third region 223 of the ultrasound image 220. The first region 221 of the ultrasound image 220 corresponds to a shallower depth than the second region 222, which in turn is shallower than the deeper third region 223. As depicted, the first region 211 and the third region 213 comprise a same amount of data in the ultrasound dataset 210. However, the first region 221 and the third region 223 of the ultrasound image 220, which comprise the first region 211 and the third region 213 of the ultrasound dataset 210 respectively after scan conversion 2152, cover different areas of the ultrasound image 220. In particular, the third region 223 is substantially larger than the first region 221. In other words, ultrasound data acquired from greater depths in the scanned subject covers more pixels during scan conversion. As the standard scan conversion techniques include nearest neighbor techniques, linear interpolation techniques, bilinear interpolation techniques, and so on, the accuracy of the interpolated results in the deeper regions is reduced in comparison to the shallower regions. As a result, some areas of the scan converted image have areas of poor resolution, especially for deeper regions such as the third region 223 of the ultrasound image 220.

One approach to improving the resolution of deeper regions of ultrasound images may include acquiring additional scan lines and samples during an ultrasound scan, so that additional acquired data can enable a higher resolution during scan conversion. Alternatively, as described further herein, another approach to achieving higher resolution of ultrasound images may include augmenting an acquired ultrasound dataset with additional data prior to scan conversion.

Figure 3:
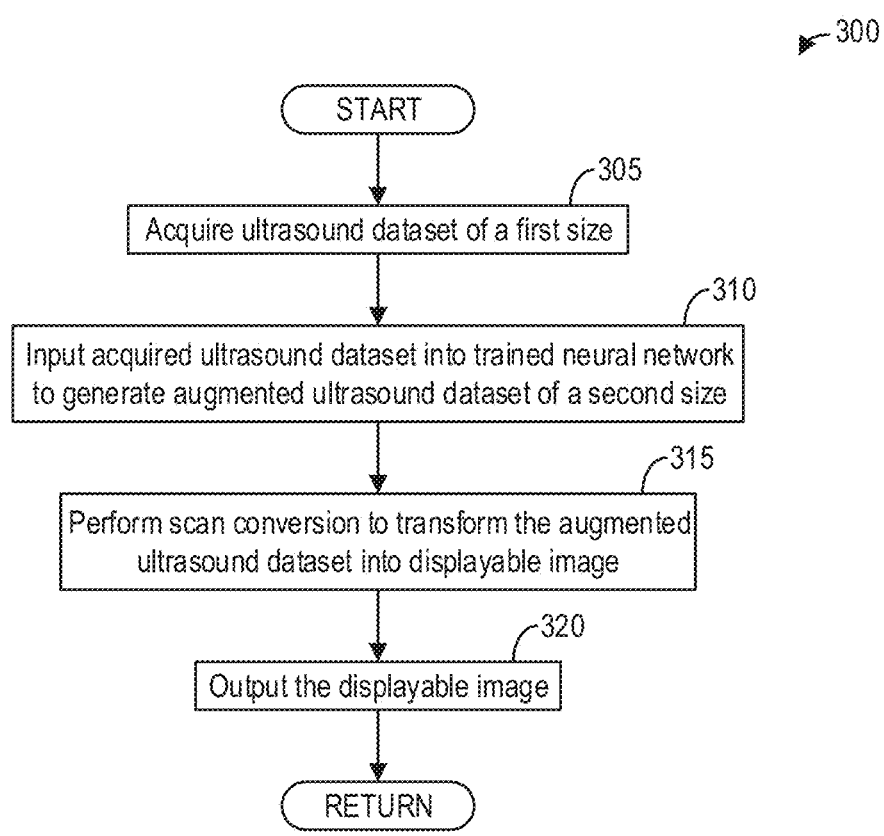
FIG. 3 shows a high-level diagram illustrating an example method for generating an augmented ultrasound dataset for a higher-resolution ultrasound image according to an embodiment.

FIG. 3 shows a high-level diagram illustrating an example method 300 for generating an augmented ultrasound dataset for a higher-resolution ultrasound image according to an embodiment. Method 300 is described with regard to the systems and components of FIG. 1, though it should be appreciated that the method 300 may be implemented with other systems and components without departing from the scope of the present disclosure. Method 300 may be stored as executable instructions in memory 120 of the ultrasound imaging system 100, for example, and may be executable by the processor 116.

Method 300 begins at 305. At 305, method 300 acquires an ultrasound dataset of a first size. The ultrasound dataset may be acquired, for example, by scanning at least a portion of a subject with the ultrasound probe 106 as described hereinabove with regard to FIG. 1.

Continuing at 310, method 300 inputs the acquired ultrasound dataset into a trained neural network to generate an augmented ultrasound dataset of a second size, the second size greater than the first size. An example neural network for generating augmented ultrasound datasets is described further herein with regard to FIG. 4, while an example method for training such a neural network is described further herein with regard to FIG. 5.

At 315, method 300 performs scan conversion to transform the augmented ultrasound dataset into a displayable image. The scan conversion may comprise any suitable scan conversion technique for geometrically transforming the augmented ultrasound dataset to Cartesian raster data, including but not limited to nearest neighbor interpolation, linear interpolation, bilinear interpolation, cubic interpolation, bicubic interpolation, and so on. At 320, method 300 outputs the displayable image. Method 300 may output the displayable image, for example, via display device 118. The image resolution of the displayable image is substantially higher than the image resolution of an image generated directly from the acquired ultrasound dataset, especially in regions of greater depth. Method 300 then ends.

Thus, a relatively high-resolution image may be obtained during an ultrasound scan without increasing the scan time (e.g., to acquire additional data) or increasing the ultrasound power. By appropriately training and tuning the neural network, the acquired ultrasound datasets may be augmented rapidly enough that images may be generated in real-time or without significant delay due to processing.

Figure 4:
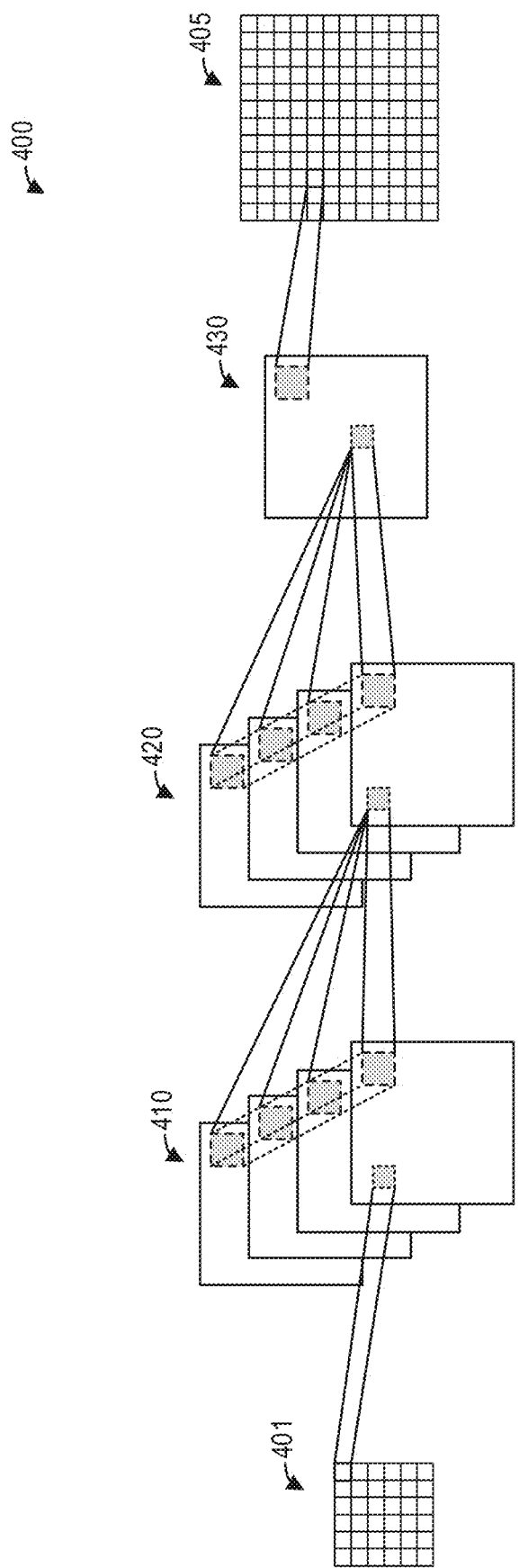
FIG. 4 shows a block diagram illustrating an example neural network for augmenting ultrasound datasets according to an embodiment.

FIG. 4 shows a block diagram illustrating an example neural network 400 for augmenting ultrasound datasets according to an embodiment. In particular, the neural network 400 receives an ultrasound dataset 401 of a first size as an input and outputs an augmented ultrasound dataset 405 of a second size greater than the first size, thus augmenting the ultrasound dataset 401. The neural network 400 is described herein with regard to the systems and components of FIG. 1, though it should be appreciated that the neural network 400 may be implemented with other systems and components without departing from the scope of the present disclosure. For example, the neural network 400 may be implemented in non-transitory memory 120 of an ultrasound imaging system 100 and executable by the processor 116 of the ultrasound imaging system 100, though it should be appreciated that in some examples the neural network 400 may be implemented in a computing system remotely positioned from an ultrasound imaging system 100 for processing ultrasound datasets as described herein.

The neural network 400 may comprise a convolutional neural network. For example, as depicted, the neural network 400 includes a first convolutional layer 410, a second convolutional layer 420, and a fully-connected layer 430. The first convolutional layer 410 receives the ultrasound dataset 401 of a first size as input and outputs the convolved results to the second convolutional layer 420. The second convolutional layer 420 convolves the convolved results from the first convolutional layer 410 and outputs the convolved results to the fully-connected layer 430. Although two convolutional layers or channels are depicted, it should be appreciated that additional convolutional layer may be included adjacent to one of the convolutional layers 410 and/or 420.

Furthermore, while convolutional neural networks typically include one or more pooling layers for reducing the number of elements of layers, such pooling layers are omitted from the neural network 400 as the images produced by the ultrasound dataset 401 and the augmented ultrasound dataset 405 are the same size.

Further still, the configuration of the fully-connected layer 430, for example the number of elements of the fully-connected layer 430, is determined according to the desired size of the augmented ultrasound dataset 405.

To train the neural network 400 to generate augmented ultrasound datasets of a desired size from smaller ultrasound datasets, a plurality of ultrasound datasets of the desired size should be obtained. As described further herein with regard to FIG. 5, each ultrasound dataset of this plurality of ultrasound datasets of the desired size may be systematically reduced in size, and the neural network 400 may then be trained using the reduced ultrasound datasets, with the original ultrasound datasets serving as a ground truth.

Figure 5:
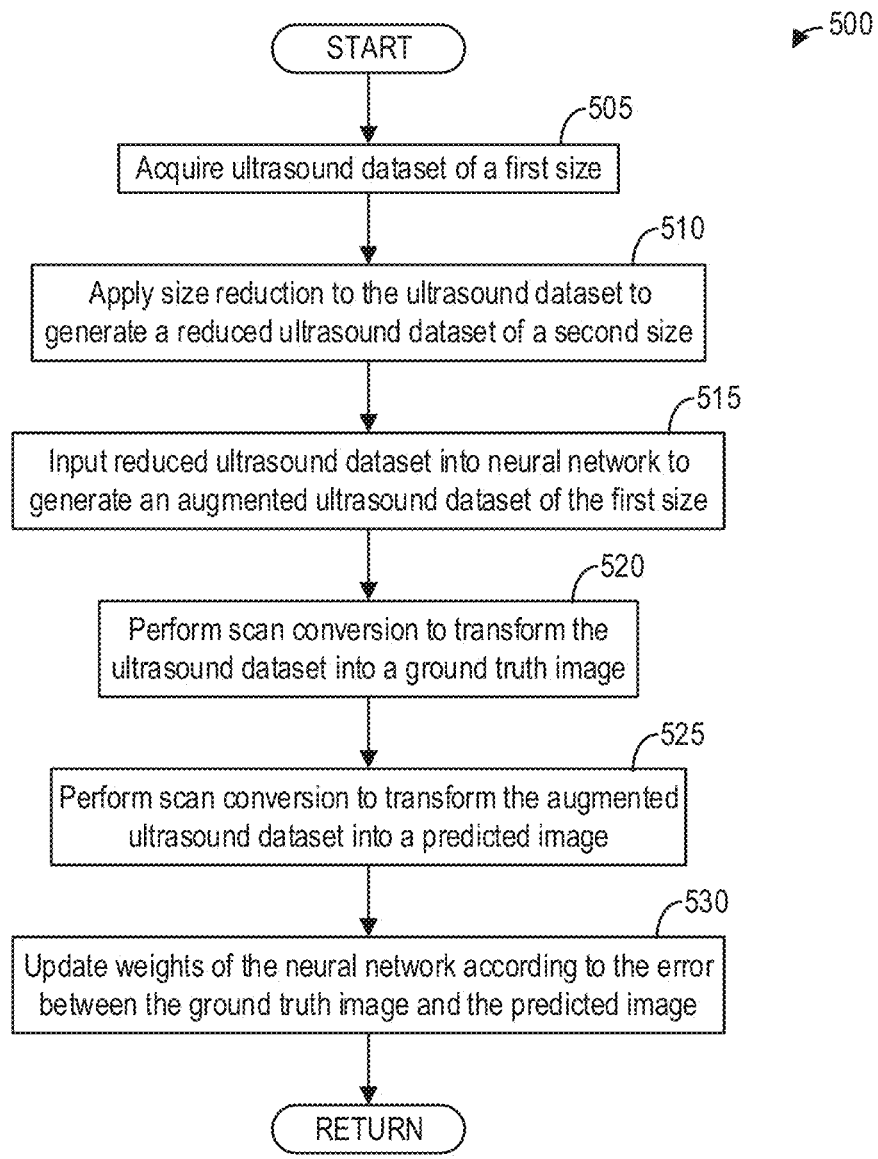
FIG. 5 shows a high-level flow chart illustrating an example method for training a neural network for augmenting ultrasound datasets according to an embodiment.

FIG. 5 shows a high-level flow chart illustrating an example method 500 for training a neural network for augmenting ultrasound datasets according to an embodiment. In particular, method 500 relates to a single iteration of training a neural network to accurately generate larger ultrasound datasets which may be used to create higher-resolution images. Method 500 is described with regard to the systems and components of FIGS. 1 and 4, though it should be appreciated that the method 500 may be implemented with other systems and components without departing from the scope of the present disclosure. Method 500 may be implemented as executable instructions, for example, in memory 120 of the ultrasound imaging system 100 and may be executable by the processor 116 to perform the actions described herein.

Method 500 begins at 505. At 505, method 500 acquires an ultrasound dataset of a first size. The first size of the ultrasound dataset may be substantially larger than the size of a typical ultrasound dataset acquired during an ultrasound scan. That is, the ultrasound dataset acquired comprises substantially more scan lines and samples than a typical ultrasound dataset. To that end, method 500 may acquire the ultrasound dataset of the first size by scanning a subject with a high-resolution acquisition mode, for example, so that additional data is acquired during a scan.

At 510, method 500 applies size reduction to the acquired ultrasound dataset to generate a reduced ultrasound dataset of a second size, wherein the first size is greater than the second size. Applying size reduction to the acquired ultrasound dataset comprises systematically forming a reduced ultrasound dataset of the second size from the acquired ultrasound dataset of the first size. For example, applying size reduction to the acquired ultrasound dataset may comprise sampling the acquired ultrasound dataset to generate the reduced ultrasound dataset. As another example, applying size reduction to the acquired ultrasound dataset may comprise truncating the acquired ultrasound dataset to generate the reduced ultrasound dataset. The second size of the reduced ultrasound dataset may be determined according to the desired size of an ultrasound dataset typically acquired during an ultrasound scan.

The size reduction of the acquired ultrasound dataset may be substantial, with a reduction ratio ranging from two to four. As an illustrative example, FIG. 6 shows pictorial examples of ultrasound datasets 600 of different sizes for two-dimensional imaging. The ultrasound datasets 600 includes an ultrasound dataset 605 of a first size 607 and an ultrasound dataset 610 of a second size 612. With regard to method 500, the ultrasound dataset 605 of the first size 607 may comprise the ultrasound dataset acquired at 505, while the ultrasound dataset 610 of the second size 612 may comprise the reduced ultrasound dataset generated at 610. As depicted, the first size 607 of the ultrasound dataset 605 is reduced by a factor of four to the second size 612. The neural network 400 described hereinabove and being trained by method 500 receives an ultrasound dataset of the second size 612 as input and outputs an ultrasound dataset of the first size 607.

Similarly, FIG. 7 shows pictorial examples of ultrasound datasets 700 of different sizes for three- or four-dimensional imaging. The ultrasound datasets 700 include a three-dimensional ultrasound dataset 705 of a first size 707 and a three-dimensional ultrasound dataset 710 of a second size 712. Thus, performing size reduction on a three-dimensional ultrasound dataset 705 of the first size 707 results in a three-dimensional ultrasound dataset 710 of the second size 712, while inputting the three-dimensional ultrasound dataset 710 of the second size 712 results in an augmented three-dimensional ultrasound dataset of the first size 707.

After applying size reduction to the acquired ultrasound dataset to generate the reduced ultrasound dataset, method 500 continues to 515. At 515, method 500 inputs the reduced ultrasound dataset into a neural network to generate an augmented ultrasound dataset of the first size. That is, the size of the augmented ultrasound dataset is equal to the size of the ultrasound dataset acquired at 505. The neural network may comprise a convolutional neural network such as the neural network 400 described hereinabove.

Continuing at 520, method 500 performs scan conversion to transform the ultrasound dataset acquired at 505 into a ground truth image. Meanwhile, at 525, method 500 performs scan conversion to transform the augmented ultrasound dataset into a predicted image. The same type of scan conversion is performed for both the ground truth image and the predicted image.

After scan converting the acquired ultrasound dataset and the augmented ultrasound dataset into the ground truth image and the predicted image, respectively, method 500 trains the neural network according to the difference between the two images. That is, continuing at 530, method 500 updates weights of the neural network according to a comparison between the ground truth image and the predicted image. More specifically, the loss function $L(Y, \hat{Y})$ of the training defines this comparison and is equal to the mean of squared difference of pixel values between the ground truth image Y and the predicted image $\hat{Y}$:

$$L(Y, \hat{Y}) = \frac{1}{P}\sum_{p=1}^{P} \|Y_p - \hat{Y}_p\|_2,$$

where P is the number of pixels of the images Y and Ŷ. The cost function may be defined as:

$$C(w_0, w_1, \ldots, w_N) = \frac{1}{M}\sum_{m=1}^{M} L(Y, \hat{Y}),$$

where M is the number of input images and $w_i$ are the parameters or weights of the neural network. At each iteration of training, the cost defined by the cost function is calculated and the error is back-propagated to update the parameters or weights $w_i$ of the neural network:

$$w_i \leftarrow w_i + \Delta w_i.$$

Specifically, the change in weight $\Delta w_i$ is calculated using a gradient descent technique to reduce the cost of the next iteration:

$$\Delta w_i = -\eta \frac{\partial C}{\partial w_i},$$

where $\eta$ is the learning rate, a user-defined hyper-parameter of the neural network. After updating the weights $w_i$ of the neural network at 530, method 500 then returns. As mentioned above, method 500 relates to a single iteration of training for the neural network. It should be appreciated that method 500 may thus be performed for a plurality of iterations to train a single neural network.

It should also be appreciated that in some examples, the neural network may be trained according to the error between the acquired ultrasound dataset and the augmented ultrasound dataset. In such an example, method 500 may be adapted to train the neural network by omitting the scan conversion at 520 and 525, and updating the weights of the neural network according to the error between the acquired ultrasound dataset and the augmented ultrasound dataset at 530. However, training the neural network according to the error between the ground truth image and the predicted image as described hereinabove is advantageous, as the neural network is trained specifically to augment the reduced ultrasound dataset for the purpose of scan conversion. That is, by training the neural network as described hereinabove with regard to FIG. 5, the image resolution is improved for an image generated from an augmented ultrasound dataset output by the neural network relative to the image resolution of an image generated from the original ultrasound dataset.

A technical effect of the disclosure includes the generation of an image with improved image resolution. Another technical effect of the disclosure includes generation of augmented ultrasound datasets from acquired ultrasound datasets that enable higher resolution images in real-time.

In one embodiment, a method comprises acquiring a first ultrasound dataset, generating a second ultrasound dataset from the first ultrasound dataset with a neural network, the second ultrasound dataset larger than the first ultrasound dataset, and scan converting the second ultrasound dataset to generate an image.

In a first example of the method, the second ultrasound dataset is two to four times larger than the first ultrasound dataset. In a second example of the method optionally including the first example, an image generated by scan converting the first ultrasound dataset is a same size as the image generated from the second ultrasound dataset. In a third example of the method optionally including one or more of the first and second examples, the method further comprises training the neural network with a plurality of acquired ultrasound datasets of a first size and a plurality of size-reduced ultrasound datasets of a second size generated from the acquired ultrasound datasets of the first size. In a fourth example of the method optionally including one or more of the first through third examples, training the neural network with the plurality of acquired ultrasound datasets of the first size and the plurality of size-reduced ultrasound datasets of the second size comprises inputting the plurality of size-reduced ultrasound datasets to the neural network to obtain a plurality of augmented ultrasound datasets of the first size, scan converting the acquired ultrasound datasets to generate a plurality of ground truth images, scan converting the plurality of augmented ultrasound datasets to generate a plurality of predicted images, and updating weights of the neural network according to a difference between the plurality of ground truth images and the plurality of predicted images. In a fifth example of the method optionally including one or more of the first through fourth examples, the first ultrasound dataset is of the second size and wherein the second ultrasound dataset is of the first size. In a sixth example of the method optionally including one or more of the first through fifth examples, scan converting the second ultrasound dataset comprises applying one of nearest neighbor interpolation, linear interpolation, bilinear interpolation, cubic interpolation, or bicubic interpolation to geometrically transform the second ultrasound dataset into the image. In a seventh example of the method optionally including one or more of the first through sixth examples, the method further comprises displaying the image in real-time as the ultrasound dataset is acquired. In an eighth example of the method optionally including one or more of the first through seventh examples, acquiring the ultrasound dataset comprises scanning a subject with an ultrasound probe.

In another embodiment, a method comprises acquiring an ultrasound dataset, reducing the ultrasound dataset to generate a reduced ultrasound dataset, and training a neural network with the ultrasound dataset and the reduced ultrasound dataset.

In a first example of the method, training the neural network with the ultrasound dataset and the reduced ultrasound dataset comprises inputting the reduced ultrasound dataset into the neural network to generate an augmented ultrasound dataset, scan converting the ultrasound dataset to generate a ground truth image, scan converting the augmented ultrasound dataset to generate a predicted image, calculating updates to weights of the neural network according to a difference between the ground truth image and the predicted image, and applying the updates to the weights of the neural network. In a second example of the method optionally including the first example, reducing the ultrasound dataset comprises selectively sampling the ultrasound dataset. In a third example of the method optionally including one or more of the first and second examples, reducing the ultrasound dataset comprises truncating the ultrasound dataset. In a fourth example of the method optionally including one or more of the first through third examples, the neural network comprises a convolutional neural network without pooling layers.

In yet another embodiment, an ultrasound system comprises an ultrasound probe including an array of transducer elements, and a processor coupled to the ultrasound probe and configured with executable instructions stored on non-transitory memory that when executed during operation of the ultrasound system, cause the processor to: acquire, with the ultrasound probe, a first ultrasound dataset; generate a second ultrasound dataset from the first ultrasound dataset with a neural network, the second ultrasound dataset larger than the first ultrasound dataset; and scan convert the second ultrasound dataset to generate an image.

In a first example of the ultrasound system, the system further comprises a display device communicatively coupled to the processor, wherein the processor is further configured with executable instructions stored on non-transitory memory that when executed cause the processor to output, via the display device, the image. In a second example of the ultrasound system optionally including the first example, the second ultrasound dataset is at least two to four times larger than the first ultrasound dataset. In a third example of the ultrasound system optionally including one or more of the first and second examples, scan converting the second ultrasound dataset to generate the image comprises applying one of nearest neighbor interpolation, linear interpolation, bilinear interpolation, cubic interpolation, or bicubic interpolation to geometrically transform the second ultrasound dataset into the image. In a fourth example of the ultrasound system optionally including one or more of the first through third examples, the neural network is trained on a plurality of acquired ultrasound datasets of a first size and a plurality of size-reduced ultrasound datasets of a second size generated from the acquired ultrasound datasets of the first size. In a fifth example of the ultrasound system optionally including one or more of the first through fourth examples, the neural network is trained with the plurality of acquired ultrasound datasets and the plurality of size-reduced ultrasound datasets by inputting the plurality of size-reduced ultrasound datasets into the neural network to obtain a plurality of augmented ultrasound datasets of the first size, scan converting the acquired ultrasound datasets to generate a plurality of ground truth images, scan converting the plurality of augmented ultrasound datasets to generate a plurality of predicted images, and updating weights of the neural network according to a difference between the plurality of ground truth images and the plurality of predicted images.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   acquiring a first ultrasound dataset;
   generating a second ultrasound dataset from the first ultrasound dataset with a neural network, the second ultrasound dataset larger than the first ultrasound dataset;
   scan converting the second ultrasound dataset to generate an image; and
   training the neural network with a plurality of acquired ultrasound datasets of a first size and a plurality of size-reduced ultrasound datasets of a second size generated from the acquired ultrasound datasets of the first size.

2. The method of claim 1, wherein the second ultrasound dataset is two to four times larger than the first ultrasound dataset.

3. The method of claim 1, wherein an image generated by scan converting the first ultrasound dataset is a same size as the image generated from the second ultrasound dataset.

4. The method of claim 1, wherein training the neural network with the plurality of acquired ultrasound datasets of the first size and the plurality of size-reduced ultrasound datasets of the second size comprises:
   inputting the plurality of size-reduced ultrasound datasets to the neural network to obtain a plurality of augmented ultrasound datasets of the first size;
   scan converting the acquired ultrasound datasets to generate a plurality of ground truth images;
   scan converting the plurality of augmented ultrasound datasets to generate a plurality of predicted images; and
   updating weights of the neural network according to a difference between the plurality of ground truth images and the plurality of predicted images.

5. The method of claim 1, wherein the first ultrasound dataset is of the second size and wherein the second ultrasound dataset is of the first size.

6. The method of claim 1, further comprising displaying the image in real-time as the ultrasound dataset is acquired.

7. The method of claim 1, wherein acquiring the ultrasound dataset comprises scanning a subject with an ultrasound probe.

8. A method, comprising:
   acquiring a first ultrasound dataset;
   generating a second ultrasound dataset from the first ultrasound dataset with a neural network, the second ultrasound dataset larger than the first ultrasound dataset; and scan converting the second ultrasound dataset to generate an image, wherein scan converting the second ultrasound dataset comprises applying one of nearest neighbor interpolation, linear interpolation, bilinear interpolation, cubic interpolation, or bicubic interpolation to geometrically transform the second ultrasound dataset into the image.

9. The method of claim 8, wherein the second ultrasound dataset is two to four times larger than the first ultrasound dataset.

10. The method of claim 8, wherein an image generated by scan converting the first ultrasound dataset is a same size as the image generated from the second ultrasound dataset.

11. The method of claim 8, further comprising training the neural network with a plurality of acquired ultrasound datasets of a first size and a plurality of size-reduced ultrasound datasets of a second size generated from the acquired ultrasound datasets of the first size.

12. The method of claim 11, wherein training the neural network with the plurality of acquired ultrasound datasets of the first size and the plurality of size-reduced ultrasound datasets of the second size comprises:
  inputting the plurality of size-reduced ultrasound datasets to the neural network to obtain a plurality of augmented ultrasound datasets of the first size;
  scan converting the acquired ultrasound datasets to generate a plurality of ground truth images;
  scan converting the plurality of augmented ultrasound datasets to generate a plurality of predicted images; and
  updating weights of the neural network according to a difference between the plurality of ground truth images and the plurality of predicted images.

13. The method of claim 11, wherein the first ultrasound dataset is of the second size and wherein the second ultrasound dataset is of the first size.

14. An ultrasound system, comprising:
  an ultrasound probe including an array of transducer elements; and
  a processor coupled to the ultrasound probe and configured with executable instructions stored on non-transitory memory that when executed during operation of the ultrasound system, cause the processor to:
    acquire, with the ultrasound probe, a first ultrasound dataset;
    generate a second ultrasound dataset from the first ultrasound dataset with a neural network, the second ultrasound dataset larger than the first ultrasound dataset; and
    scan convert the second ultrasound dataset to generate an image, wherein scan converting the second ultrasound dataset to generate the image comprises applying one of nearest neighbor interpolation, linear interpolation, bilinear interpolation, cubic interpolation, or bicubic interpolation to geometrically transform the second ultrasound dataset into the image.

15. The system of claim 14, further comprising a display device communicatively coupled to the processor, wherein the processor is further configured with executable instructions stored on non-transitory memory that when executed cause the processor to output, via the display device, the image.

16. The system of claim 14, wherein the second ultrasound dataset is at least two to four times larger than the first ultrasound dataset.

17. The system of claim 14, wherein the neural network is trained on a plurality of acquired ultrasound datasets of a first size and a plurality of size-reduced ultrasound datasets of a second size generated from the acquired ultrasound datasets of the first size.

18. The system of claim 17, wherein the neural network is trained with the plurality of acquired ultrasound datasets and the plurality of size-reduced ultrasound datasets by inputting the plurality of size-reduced ultrasound datasets into the neural network to obtain a plurality of augmented ultrasound datasets of the first size, scan converting the acquired ultrasound datasets to generate a plurality of ground truth images, scan converting the plurality of augmented ultrasound datasets to generate a plurality of predicted images, and updating weights of the neural network according to a difference between the plurality of ground truth images and the plurality of predicted images.

19. An ultrasound system, comprising:
  an ultrasound probe including an array of transducer elements; and
  a processor coupled to the ultrasound probe and configured with executable instructions stored on non-transitory memory that when executed during operation of the ultrasound system, cause the processor to:
    acquire, with the ultrasound probe, a first ultrasound dataset;
    generate a second ultrasound dataset from the first ultrasound dataset with a neural network, the second ultrasound dataset larger than the first ultrasound dataset; and
    scan convert the second ultrasound dataset to generate an image, wherein the neural network is trained on a plurality of acquired ultrasound datasets of a first size and a plurality of size-reduced ultrasound datasets of a second size generated from the acquired ultrasound datasets of the first size.

20. The system of claim 19, wherein the neural network is trained with the plurality of acquired ultrasound datasets and the plurality of size-reduced ultrasound datasets by inputting the plurality of size-reduced ultrasound datasets into the neural network to obtain a plurality of augmented ultrasound datasets of the first size, scan converting the acquired ultrasound datasets to generate a plurality of ground truth images, scan converting the plurality of augmented ultrasound datasets to generate a plurality of predicted images, and updating weights of the neural network according to a difference between the plurality of ground truth images and the plurality of predicted images.

* * * * *